United States Patent
Weng

(10) Patent No.: US 8,558,528 B2
(45) Date of Patent: Oct. 15, 2013

(54) HIGH ACCURACY INDUCTOR PEAK CURRENT CONTROL SCHEME FOR SWITCHING POWER SUPPLY

(75) Inventor: Da Feng Weng, Sunnyvale, CA (US)

(73) Assignee: Da Feng Weng, Sunnyvale, CA (US)

( * ) Notice: Subject to any disclaimer, the term of this patent is extended or adjusted under 35 U.S.C. 154(b) by 337 days.

(21) Appl. No.: 13/065,836

(22) Filed: Mar. 31, 2011

(65) Prior Publication Data

US 2012/0181999 A1  Jul. 19, 2012

(30) Foreign Application Priority Data

Jul. 22, 2010 (CN) .......................... 2010 1 0234661

(51) Int. Cl.
G05F 1/575 (2006.01)
(52) U.S. Cl.
USPC .......................................... 323/284; 323/283

(58) Field of Classification Search
USPC ................................................. 323/283–284
See application file for complete search history.

(56) References Cited

U.S. PATENT DOCUMENTS

| | | | |
|---|---|---|---|
| 6,061,258 A * | 5/2000 | Galbiati et al. | 363/98 |
| 2008/0192515 A1* | 8/2008 | Huynh et al. | 363/21.12 |
| 2009/0302774 A1* | 12/2009 | Mednik et al. | 315/209 R |
| 2011/0062932 A1* | 3/2011 | Hawkes | 323/288 |

* cited by examiner

*Primary Examiner* — Harry Behm

(57) ABSTRACT

The invention is composed of peak current generator, peak current detector, peak current error amplifier and compensator, peak current controller and MOSFET driver. The advantage of the invention is to control switching converter's inductor peak current in high accuracy. The invention can automatically compensate error due to inductor current rising slope, the delay times Td, Tp of comparator and driver and comparator's offset voltage. The invention can largely decrease performance requirements of comparator and driver circuit and help to down the cost to implement the system.

4 Claims, 2 Drawing Sheets

1-Peak current generator;  2-Peak current detector (2-1 peak detector;  2-2 sample-holder);

3-Peak error amplifier and compensator;  4-Peak current controller;  5-MOSFET Driver 1----Comparator;  2--- Switch's Driver 1-Peak current generator;  2-Peak current detector;  3-Peak error amplifier and compensator;

4-Peak current controller;  5-MOSFET Driver

1-Peak current generator; 2-Peak current detector (2-1 peak detector; 2-2 sample-holder);

3-Peak error amplifier and compensator; 4-Peak current controller; 5-MOSFET Driver

HIGH ACCURACY INDUCTOR PEAK CURRENT CONTROL SCHEME FOR SWITCHING POWER SUPPLY

TECHNICAL FIELD

Embodiments of the invention described herein relate generally to electronics control and current type switching power supply control and more particularly to high accuracy inductor peak current control scheme for switching power supply.

BACKGROUND

In current type switching power supply control, the peak current mode control is one of general control methods. It can be used in several switching power supplies control, e.g. constant turn-off time control and inductor current critical discontinuous control etc. In practical application, the inductor peak current mode control can't be controlled in high accuracy. In general, the control method is implemented with a comparator, that is, the detected inductor peak current is compared with a fixed reference signal level; as the detected inductor peak current is higher than the fixed reference signal level, the comparator turns from "1" into "0" and the power switch is turned off through switching power supply driving circuit. In the general control implement, the real inductor peak current isn't equal to the fixed reference signal level. There is a difference $\Delta iL$ between the real inductor peak current and the fixed reference signal level. It is impacted with several issues, the first is the inductor rising up slope; the second is the delay times Td and Tp of the comparator and switching power supply driving circuit; the third is the offset voltage of the comparator; the fourth is the comparator needs driving energy, that is, driving charge $Q=\Delta V*\Delta Td/2$. It is those issues that make the real inductor peak current variable with the input and output voltages of the switching power supply (as shown in FIG. 1). As the input voltage of the switching power supply increases, the inductor current rising up slope increases. For the fixed delay times Td and Tp of the comparator and switching power supply driving circuit, the difference $\Delta iL$ increases due to the slope of the inductor current. As the input voltage of the switching power supply decreases, the inductor current rising up slope decreases. For the fixed delay times Td and Tp of the comparator and switching power supply driving circuit, the difference $\Delta iL$ decreases due to the slope of the inductor current. It is clear that to decrease the difference $\Delta iL$, the fixed delay times Td and Tp of the comparator and switching power supply driving circuit must be decreased. In practical application, it is very difficult to largely decrease the fixed delay times Td and Tp of the comparator and switching power supply driving circuit.

In most application of the current type switching power supply, it is required that the average output current should be independent of input and output voltages, e.g. in LED driving application, the accuracy of the output current is required under 5%. For step down DC-DC converter inductor current critical discontinuous control case, the average output current is half of the peak inductor current. In order to make the accuracy of the output current under 5%, it requires the accuracy of the peak inductor current under related level.

SUMMARY OF THE INVENTION

In most of current type switching power supply application, the output current must be constant. The goal of the invention is to overcome the existed problem that is, the existed inductor peak current mode control isn't suitable to control or regulate the output current of the switching power supply and provides a high accuracy inductor peak mode control scheme to make the output current of the switching power supply constant.

The invention is composed of peak current generator, peak current detector, peak current error amplifier and compensator, peak current controller and MOSFET driver; peak current generator is based on required output current to generate related peak current reference; peak current detector is used to detect the real inductor peak current; peak current error amplifier and compensator is used to amplifier and compensate the error between the real inductor peak current and related peak current reference and its output is used as the control voltage of the peak current controller; peak current controller is to compare the real inductor current with the output of peak current error amplifier and compensator to generator related PWM control signal; PWM signal is amplified in MOSFET driver and control MOSFET turn-on and off.

Peak current detector is composed of peak detector and sample holder.

Peak error amplifier and compensator is composed of error PID amplifier.

Peak current controller is composed of a general comparator

The advantage of the invention is to control switching converter's inductor peak current in high accuracy.

The advantage of the invention can automatically compensate error due to inductor current rising slope, the delay times Td, Tp of comparator and driver and comparator's offset voltage.

The advantage of the invention can largely decrease performance requirements of comparator and driver circuit due to automatic compensation and correction function. It can help to down the cost to implement the system.

DETAILED DESCRIPTION OF THE INVENTION

Figure 1:
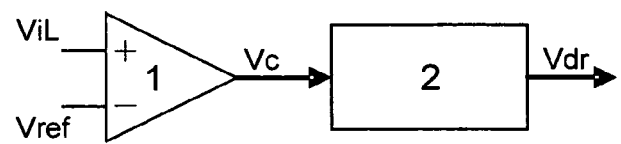
FIG. 1 illustrates the existed switching power supply inductor peak current control scheme and related error.
Figure 1:
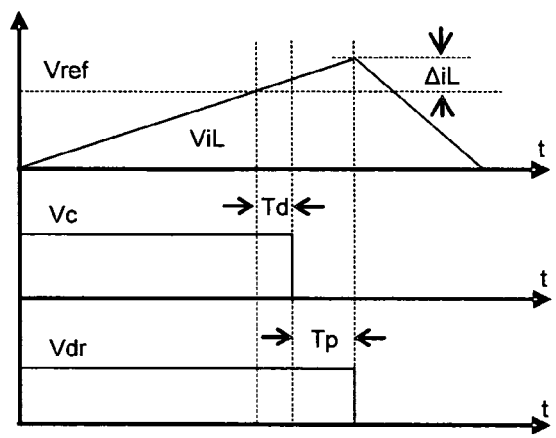
Figure 2:
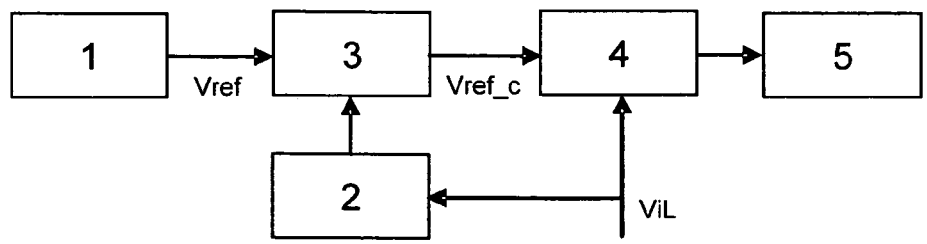
FIG. 2 illustrates the proposal invention diagram of high accuracy peak inductor current control scheme for switching power supply

As shown in FIG. 2, The invention of high accuracy peak inductor current control scheme for switching power supply is composed of peak current generator, peak current detector, peak current error amplifier and compensator, peak current controller and MOSFET driver; peak current generator is based on required output current to generate related peak current reference; peak current detector is used to detect the real inductor peak current; peak current error amplifier and compensator is used to amplifier and compensate the error between the real inductor peak current and related peak current reference and its output is used as the control signal of the peak current controller; peak current controller is to compare the real inductor current with the output of peak current error amplifier and compensator to generator related PWM control signal; PWM signal is amplified in MOSFET driver and control MOSFET turn-on and off.

Figure 3:
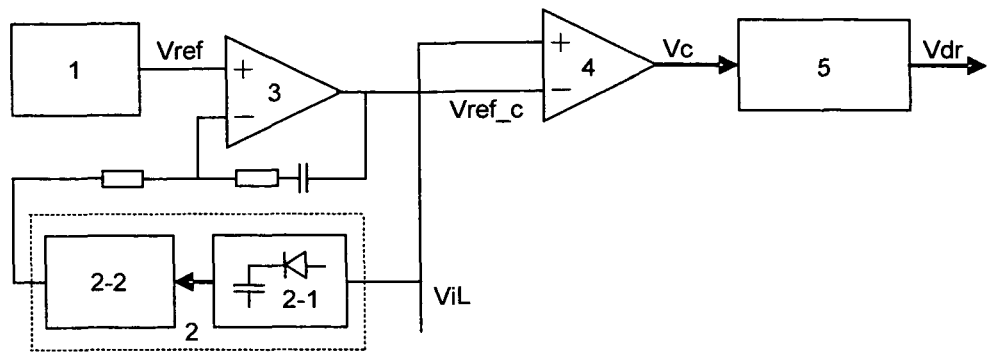
FIG. 3 illustrates an electrical circuit diagram of high accuracy peak inductor current control scheme for switching power supply according to preferred embodiment of the instant invention
Figure 4:
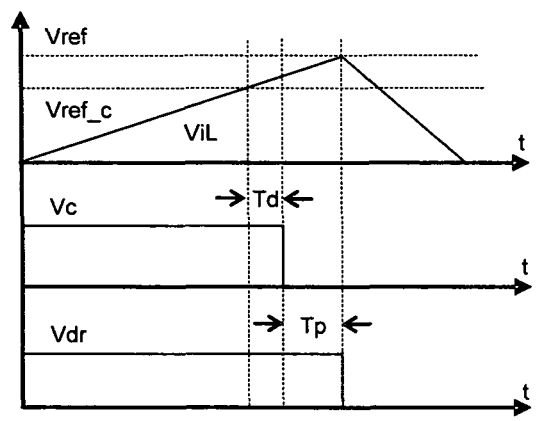
FIG. 4 illustrates a time domain waveforms for high accuracy peak inductor current control scheme for switching power supply according to preferred embodiment of the instant invention

FIG. 3 gives a detail preferred embodiment circuit of high accuracy peak inductor current control scheme for switching power supply. The peak current detector is composed of a peak detector and a sample-holder. The sample holder is to sample the output of the peak detector during the power switch turn-off interval. In this way, the output of the sample-holder is a variable signal voltage with the inductor peak current. The peak current error amplifier and compensator is composed of a general operation amplifier and compensation network. The peak current controller is composed of a general comparator. One of the comparator's input is the detected inductor current signal and the other of the comparator's input is the output Vref-c of the peak current error amplifier and compensator. In the invention of high accuracy peak inductor current control scheme for switching power supply, it is the close loop regulation that makes it possible to implement high accuracy peak inductor current control scheme for switching power supply with general low cost function blocks FIG. 4 gives the time domain waveforms of detail preferred embodiment circuit of high accuracy peak inductor current control scheme for switching power supply. Please pay attention, the output change instant of the peak current controller, that is, the comparator turn-off instant, is the inductor current just reached Vref_c not the peak value Vref. The inductor current will keep to increase for two delay times, Td and Tp of the comparator and MOSFET driver. It is the function of the peak current error amplifier and compensator that makes the inductor peak current much close to the peak reference current value Vref, that is, the related error $\Delta IL$ is very small and the error $\Delta iL$ is independent of the variation of the input voltage as long as the bandwidth of the peak current error amplifier and compensator is much higher than the variable frequency of the input voltage. It means that the peak current error amplifier and compensator 3 can compensate the error of the inductor current raising up slope, delay times, Td and Tp of the comparator and MOSFET driver and comparator offset voltage. It is the automatic error compensation function that can largely decrease the performance requirements of comparator and driver circuit and cost down the system implement.

What is claimed is:

1. A high accuracy peak inductor current switch controller comprising a peak current generator, a peak current detector, a peak current error amplifier and compensator, a peak current controller and a driver; wherein the peak current generator generates a peak current reference based upon a required output current;

the peak current detector detects a real inductor peak current; the peak current error amplifier and compensator amplifiers and compensates an error between the real inductor peak current and the related peak current reference to output a control voltage to the peak current controller;

the peak current controller compares the real inductor current with the control voltage to generate a PWM control signal;

the driver receives the PWM control signal and switches a power switch on and off.

2. The high accuracy peak inductor current switch controller of claim 1, wherein the peak current detector comprises a peak detector and sample holder.

3. The high accuracy peak inductor current switch controller of claim 1, wherein the peak error amplifier and compensator comprises a PID error amplifier.

4. The high accuracy peak inductor current switch controller of claim 1, wherein the peak current controller comprises a general comparator.

* * * * *